Feb. 19, 1935. McKINLEY STOCKTON 1,991,583
METHOD OF MILLING DIATOMACEOUS EARTH
Filed Nov. 27, 1931
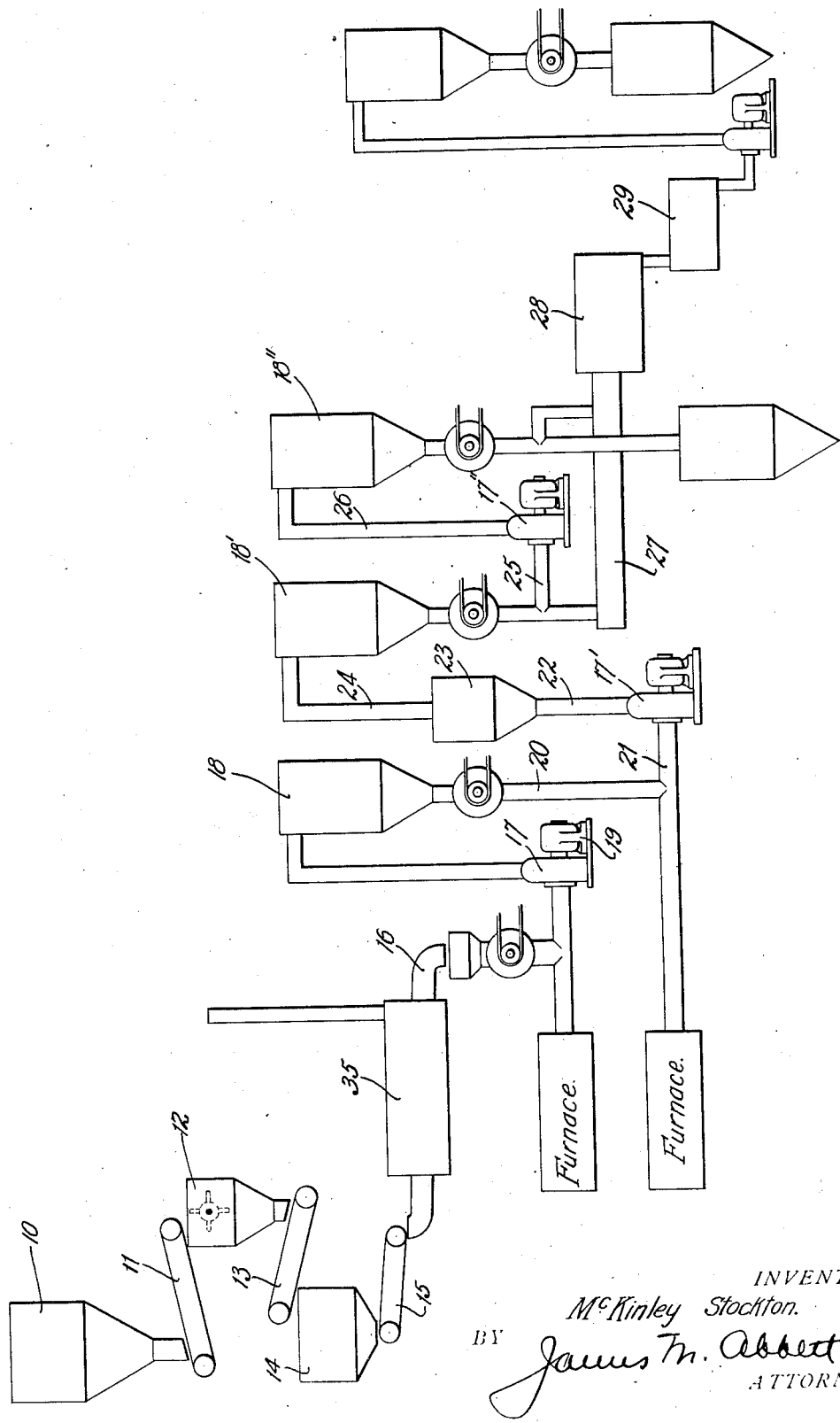
INVENTOR
McKinley Stockton.
BY James M. Abbott
ATTORNEY Patented Feb. 19, 1935

1,991,583

UNITED STATES PATENT OFFICE 1,991,583

METHOD OF MILLING DIATOMACEOUS EARTH

McKinley Stockton, Los Angeles, Calif., assignor to The Dicalite Company, Los Angeles, Calif., a corporation of Delaware Application November 27, 1931, Serial No. 577,498

2 Claims. (Cl. 83—94)

This invention relates to a milling method and particularly pertains to a method of reducing diatomaceous earth to a desired degree and character of fineness.

Diatomaceous earth in its native state occurs in earth deposits from which it is mined, its natural form being consolidated and more or less coherent masses of diatoms. These diatoms being for the most part coarser than one micron in size.

In the preparation of an organic filter aid from these masses of diatomaceous earth it has been heretofore customary to reduce them to a desired degree of fineness by passing the diatomaceous earth through milling machinery which functioned both to disintegrate the masses while violently milling them and to convey the material through the apparatus. In such apparatus it has been customary to employ milling machinery which included a swing hammer or beater arms operating in separate units, or such means in combination with high speed paddle wheel fans. These fans have for the most part operated at a speed of the order of 1700 R. P. M. with the tips of the paddle wheels traveling at a speed of approximately 15,000 feet per minute while creating air velocities of the order of 6000 feet per minute and moving air containing approximately one pound of diatomaceous earth to 67 cubic feet of air. After this milling the product has been suitably conveyed, dried and milled, and separated to predetermined degrees of fineness. In the use of such products it has been found that the milling method above described has for the most part destroyed or so damaged the structure of the constituent diatoms that when used as a filter aid, the filtration rate of the milled product is seriously reduced without any compensating improvement in the clarification of the filtrate.

It is the principal object of the present invention, therefore, to provide a method of milling diatomaceous earth whereby the earth may be reduced to a desired degree of fineness with the preservation of a maximum percentage of the diatoms in their original structural form, thereby obtaining a product having a relatively rapid filtration rate and a high clarifying power.

The present invention contemplates the use of apparatus heretofore employed in practicing any method of milling diatomaceous earth and kindred products, but in which this apparatus is used in such manner as to obtain a product having greater clarifying efficiency than is commonly obtained, and by a novel method which will be hereinafter set forth.

The invention is illustrated by way of example in the accompanying drawing in which the figure is a diagrammatic view of a typical milling plant, indicating the flow of the product therethrough.

Referring more particularly to the drawing, 10 indicates a crude product bin into which lumps of diatomaceous earth are deposited and from which they are carried by a conveyor 11 to a hammer mill 12 where they are reduced to the form of small lumps. A conveyor 13 carries the product to a storage bin 14. It is to be understood that when the product is mined it carries a large percentage of moisture, and in fact, when it reaches the storage bin its moisture content ranges from 35 to 60 per cent. The product is then withdrawn from the storage bin by a conveyor 15 and passes through a conduit 16 which is in communication with a suitable auxiliary furnace 30 or with the kilns in which the product is subsequently calcined) to and through a fan 17 and thence to a cyclone separator 18 together with the heated air from the furnace.

During the conveying operation the earth product with the heated air from the furnace must pass through the fan 17 and may subsequently pass through other fans hereinafter to be described. These fans are preferably formed with a plurality of blades, the fans being approximately 36 inches in diameter and the blades being approximately 18 inches in width. These dimensions of course, depend upon the amount of air which it is desirable to move in order to obtain the most efficient results.

In actual operation it has been found that by reducing the milling action of the fan and moving a larger volume of air per unit of diatomaceous earth, as for example approximately 75 cubic feet of air per pound of earth, a more desirable product is obtained. The effect is to comminute the earth in a more gentle manner by the mutual collision of the particles while suspended in the rapidly moving air, rather than by collision with the fan blades and the case, and they are thus reduced to a desired degree of fineness without materially damaging the original structural form of the constituent diatoms.

In carrying out the present invention I find that when the paddle wheel velocities are held well below a tip speed of 15,000 feet per minute; as for example, tip speeds ranging from 9600 feet per minute up to 14,000 feet per minute, the diatoms are not seriously broken, and at this rate of speed it has been easily possible to double the flow rate of diatomaceous earth filter aid without in any way impairing its clarifying power. This is a surprising phenomenon, since it has always been assumed in the art that the character of the fine particles produced in similar systems of milling were characteristic of the earth itself and not the manner in which it is milled.

In the practice of this invention I have found that any diatomaceous earth may be more suitably milled and its filtration characteristics materially improved by operating the fans at lower speeds and without the harsh milling formerly practiced.

It has also been found desirable to drive the fans 17 by a variable speed motor 19 so that the optimum fan speed may be established for any quality or condition of raw earth to be treated in the apparatus. After the comminuted product in a partially dried state has been passed through the cyclone separator 18 its moisture content will be of the order of 25 to 30 per cent. It is then carried through a conduit 20 and delivered to a conduit 21 where it is further dehydrated by hot gases from a furnace 31 in passing through by the fan 17', which is of similar construction to the one previously described. A conduit 22 leads the product to a collector and classifier 23, from which a desired product is caused to pass through a conduit 24 to another cyclone separator 18', at which point the product is of a state of dehydration in the order of 5 per cent.

It is understood that this cycle of operation might be repeated any desired number of times, for example, with the product in a desired degree of fineness and of dehydration, it may then be fed through conduit 25 by a fan 17" and then through a conduit 26 to a third cyclone separator 18", or if desired, it may be fed to a conveyor 27 by which it will be conducted into a kiln 28. Within this kiln it is subjected to the action of heat tending to remove the associated organic matter and to cause the particles to acquire a more porous character which will render them highly desirable filter aids.

The calcined product will then flow from the end of the kiln 28 to a cooler 29 and may thereafter be suitably conveyed and stored.

Attention is particularly directed to the method of drying here practiced, since it has been found that where materials heavily laden with moisture are introduced into the plant and rapidly dried severe milling effects are produced. This is due to the fact that the wet earth seems to be more sensitive to milling conditions and under any violent impact or abrasion breaks down to a much finer degree than where the product has been gradually tempered with heat and gradually dries without destroying its original structure. The previous rapid drying methods have materially reduced the utility of the product as a filter aid as compared with a product which is pre-dried and fed through the milling system while containing less than 25 percent moisture. The latter product has proven to be less friable and the particles are of a more uniform size, the wasteful destruction of usable material by the breaking down of the diatom structure being avoided.

A suitable pre-dryer is indicated at 35 in the drawing and is interposed between the bin 14 and the pipe 16. This predryer may be of any desired type, as a hearth, muffle or rotary kiln, but in whatever form it must be of such dimensions as to retard the flow of earth and remove the desired proportion of water from the lump earth at such relatively low temperature as will not glaze or sinter the lumps.

Attention is further directed to the fact that the customary speed of a swinghammer or beater arm mill is approximately 1200 R. P. M., and it has been found that by reducing the range of speed of this mill to from 500 to 1000 R. P. M., the resulting product will contain less broken diatoms, giving a superior flow rate as a filter aid with equal clarifying power.

It will thus be seen that the method here disclosed contemplates the handling and comminution of diatomaceous earth with as small amount of violent motion and attrition as possible, while reducing the product to a predetermined degree of fineness and dryness without materially breaking down the structure of the diatoms.

While I have shown the preferred form of my method as now known to me it will be understood that various changes might be made in the steps of the operation and the order of the steps without departing from the spirit of the invention as claimed.

Having thus described my invention, what I claim and desire to secure by Letters Patent is:—

1. A method of comminuting diatomaceous earth which comprises: breaking the crude moist earth to smaller lumps; subjecting said lumps to a slow predrying operation and reducing the water content of said lumps to approximately 25% by weight, and thereafter passing said predried lumps, together with a stream of heated gas, through a comminuting operation in which drying and comminution are simultaneously completed.

2. The method of producing a dried and comminuted diatomaceous earth product which includes the following steps in the order stated: partially comminuting the crude moist earth by passing said earth through a swing-hammer mill; subjecting the partially comminuted moist earth to a drying operation and partially removing water to only such extent as to render the earth particles readily friable, and finally suspending said partially comminuted and partially dried earth in a stream of heated gas and completing the drying and comminution of said earth while in said suspension.

McKINLEY STOCKTON.